(12) United States Patent
Pöchmüller

(10) Patent No.: US 6,472,977 B1
(45) Date of Patent: Oct. 29, 2002

(54) METHOD FOR THE DISPLAYING INFORMATION IN A MOTOR VEHICLE

(75) Inventor: Werner Pöchmüller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,205

(22) PCT Filed: Aug. 20, 1998

(86) PCT No.: PCT/DE98/02438

§ 371 (c)(1),
(2), (4) Date: Jun. 15, 2000

(87) PCT Pub. No.: WO99/10195

PCT Pub. Date: Mar. 4, 1999

(30) Foreign Application Priority Data

Aug. 23, 1997 (DE) .......................................... 197 36 774

(51) Int. Cl.⁷ ................................................. B60Q 1/00
(52) U.S. Cl. ..................... 340/425.5; 340/435; 340/436; 340/426; 340/425.5; 340/937; 340/903
(58) Field of Search ................................. 340/435, 903, 340/937, 425.5, 436, 426; 180/167, 169, 270; 348/135, 136, 137, 140, 148, 149, 142

(56) References Cited

U.S. PATENT DOCUMENTS 5,844,505 A * 12/1998 Van Ryzin .................... 340/988
5,850,254 A * 12/1998 Takano et al. ............... 348/148
6,057,754 A * 5/2000 Kinoshita et al. ............ 340/435

FOREIGN PATENT DOCUMENTS

| DE | 31 47 767 A | 6/1983 |
| DE | 41 42 091 A | 8/1993 |
| DE | 296 09 922 U | 8/1996 |
| EP | 0 678 823 A | 10/1995 |
| FR | 2 672 411 A | 8/1992 |

OTHER PUBLICATIONS

"On–Board Computer 'Reads' Road Signs", Industry Week, vol. 246, No. 1, Jan. 6, 1997, p. 33.*

* cited by examiner

Primary Examiner—Daryl Pope
(74) Attorney, Agent, or Firm—Kenyon & Kenyon

(57) ABSTRACT

A method for the display of information in a motor vehicle, in which a segment of an image from a camera is displayed on a display unit and the image segment contains a road sign after analysis by a control and analysis unit.

16 Claims, 5 Drawing Sheets

METHOD FOR THE DISPLAYING INFORMATION IN A MOTOR VEHICLE

FIELD OF THE INVENTION

The present invention concerns a method and apparatus for displaying information in a motor vehicle.

BACKGROUND INFORMATION

In present-day motor vehicles, absolutely no automated functions exist to support the driver in recognizing road signs. Such a function has, however, a high comfort and safety value, for example, in warning the driver of speed limits or prohibitions against passing and/or in informing the driver of temporarily applicable limitations to his request. As a practical matter, with the existing traffic infrastructure, road signs can only be recognized and analyzed with the aid of image sensors since the information is only available for analysis in optical form. Owing to the high comfort and safety relevance of road sign recognition, work is being done on video-based road sign recognition. All of the known approaches are based on a limited number of road signs to be recognized. Based on the number of signs to be recognized, the image recorded by the camera undergoes image segmenting to recognize and classify the relevant road signs. With the appropriate classification, the information in the road sign is obtained, for example, a 70 km/h speed limit. The classified road sign information is reported to the driver via an appropriate display area in which, for example, the number combination "70" is displayed. The method of analyzing the information in the image obtained by the sensor for road signs and displaying the information to the driver may be problematic because the classification must be made very reliably. Otherwise it cannot be ruled out that the driver may be given incorrect information. It is believed that incorrect classifications may not only reduce the acceptance of such a system, as well as its reliabilty. If for example, a driver is supplied with an incorrect speed limit resulting in his exceeding the maximum speed limit, the question arises as to who will assume the liability for damages resulting from this. Based on the related art, incorrect classifications cannot be ruled out in the recognition of road signs.

SUMMARY OF THE INVENTION

In contrast, the method according to an exemplary embodiment of the present invention for the display of information has the advantage that a segment of the image obtained by the sensor is displayed directly without an analysis of the content of the road sign and a classification being made. The analysis of the camera's image searches for the outlines of the road signs and presents this image segment directly to the driver. The driver himself performs the classification; the road sign is merely pointed out to him and it is presented to him as a support. Should an error occur in the analysis, the driver is only presented an image segment without a road sign which he can simply ignore.

In an exemplary embodiment, information in addition to the road sign can be presented if the analysis unit additionally receives information from other vehicle sensors besides the camera, and both the time as well as the distance since the last recognition of a road sign can be displayed.

The exemplary method, method can also record road signs with supplemental information, for example, "only when wet" in the case of speed limits. The road sign is displayed with the additional sign, the presentation in the display area not actually being able to resolve the lettering but pointing out the presence of the supplemental sign.

It is also believed that with additional warning of the driver based on a road sign classification, the transparency of the method is preserved. The driver can easily compare the acoustic, haptic, or optical warning to the driver based on the information processing by comparing it with the image in the display area.

DETAILED DESCRIPTION

Figure 1:
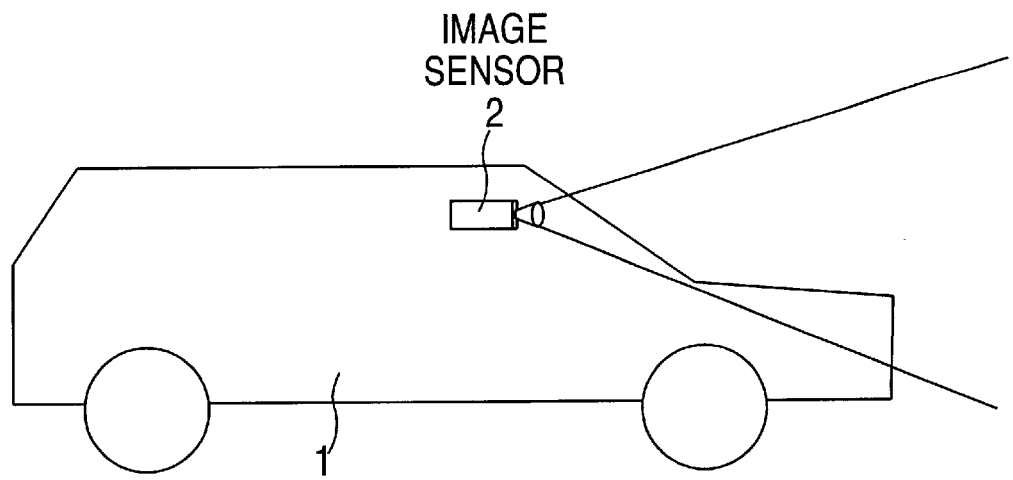
FIG. 1 shows a vehicle with an image sensor.
Figure 2:
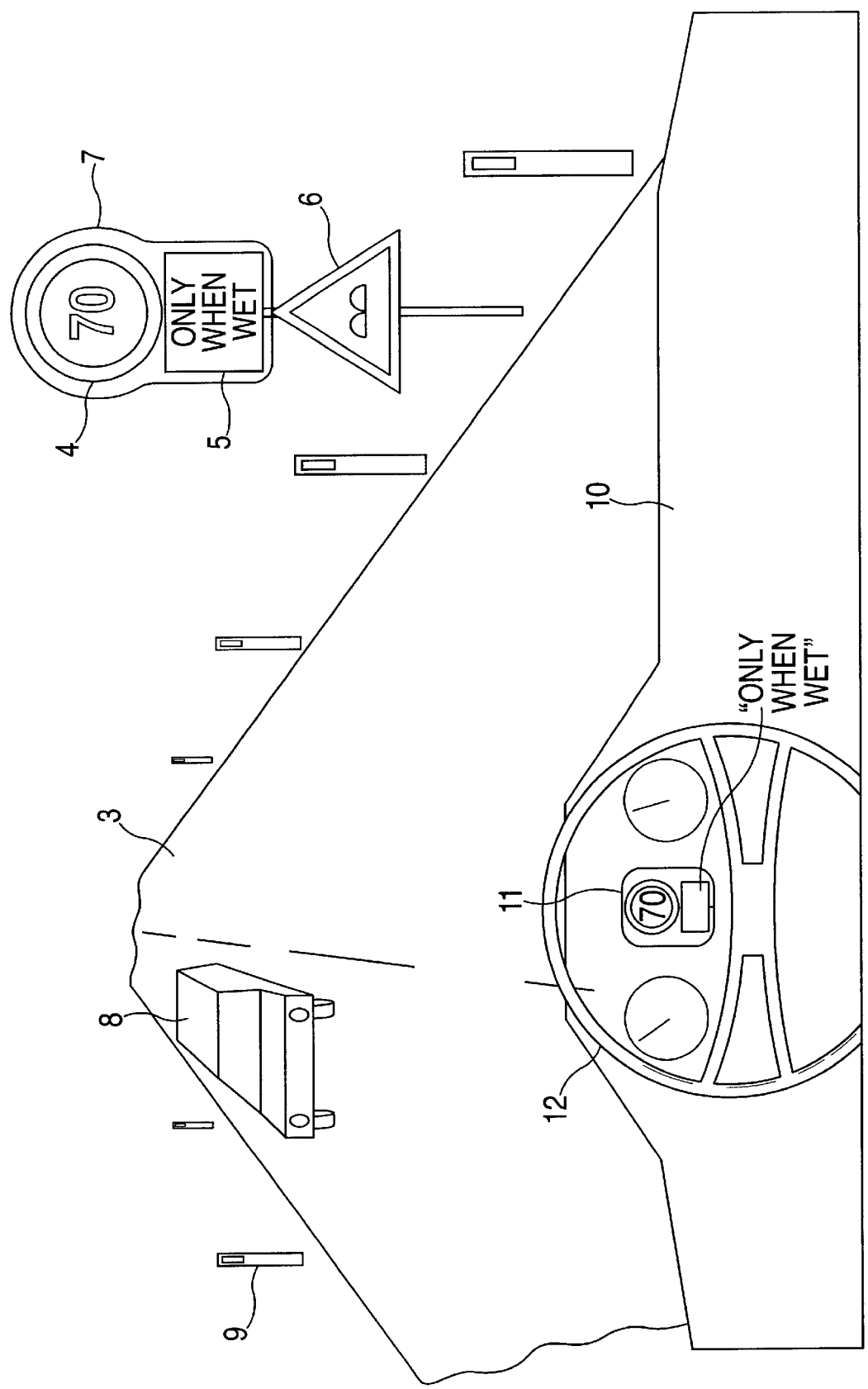
FIG. 2 shows an exemplary road scene.

FIG. 1 shows the positioning of image sensor 2 within vehicle 1. Image sensor 2 is attached as high as possible in a central position behind the windshield, the viewing direction being in alignment with the direction of travel. The sensor should still be located in the area of the windshield wipers. FIG. 2 shows a roadway 3, which, for example, is bordered by reflector posts 9. A vehicle 8 approaching from the opposite direction is shown schematically on the opposite roadway. A traffic sign combination is installed on the right edge of the roadway. Road sign 4 has a limiting additional sign 5. In addition, road sign 6 for a "Rough Road" is also installed. From the view of the driver, the instrument panel 10 of his own vehicle can be seen with steering wheel 12. A screen 11 is fitted into instrument panel 10 in the field of view of the driver, and image segment 7 with the relevant road signs is recorded by the image sensor and separated out by the image processing being displayed on screen 11.

Figure 6:
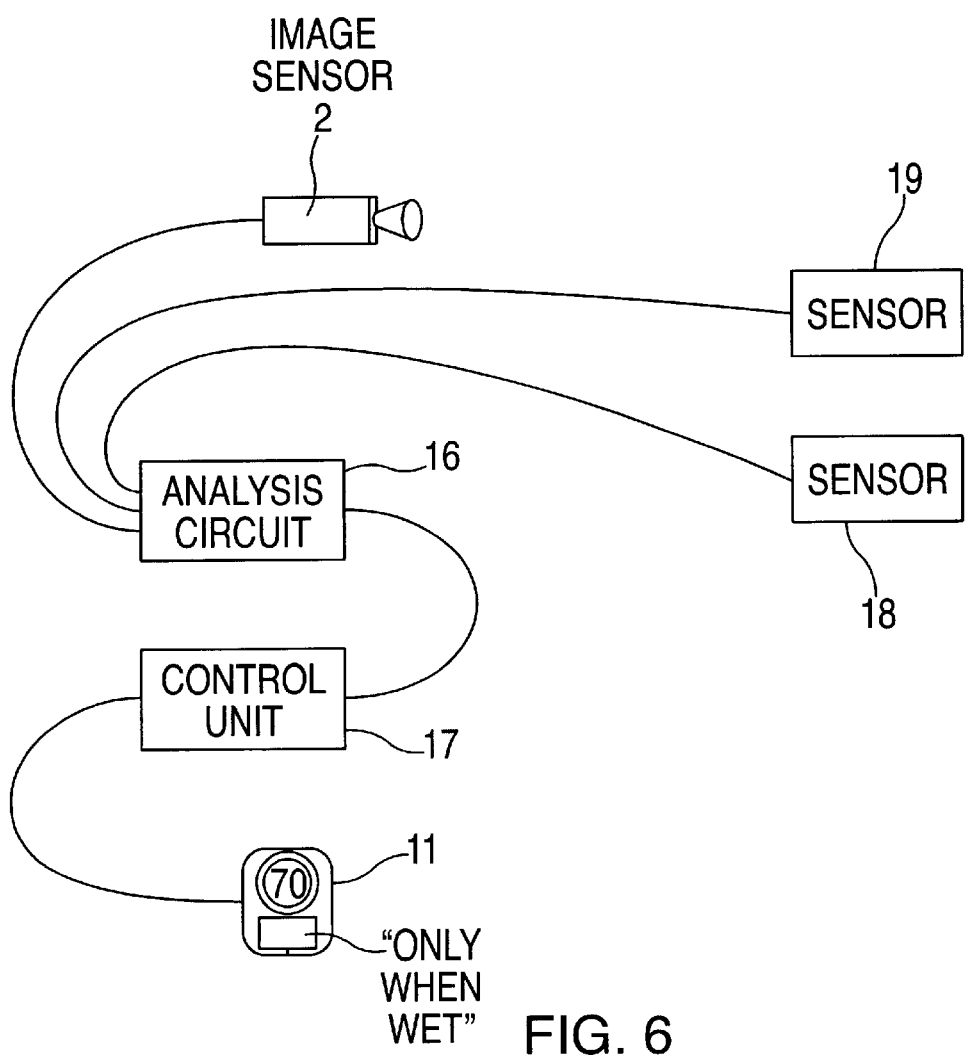
FIG. 6 shows a schematic representation of the sensor technology in the motor vehicle.
Figure 3:
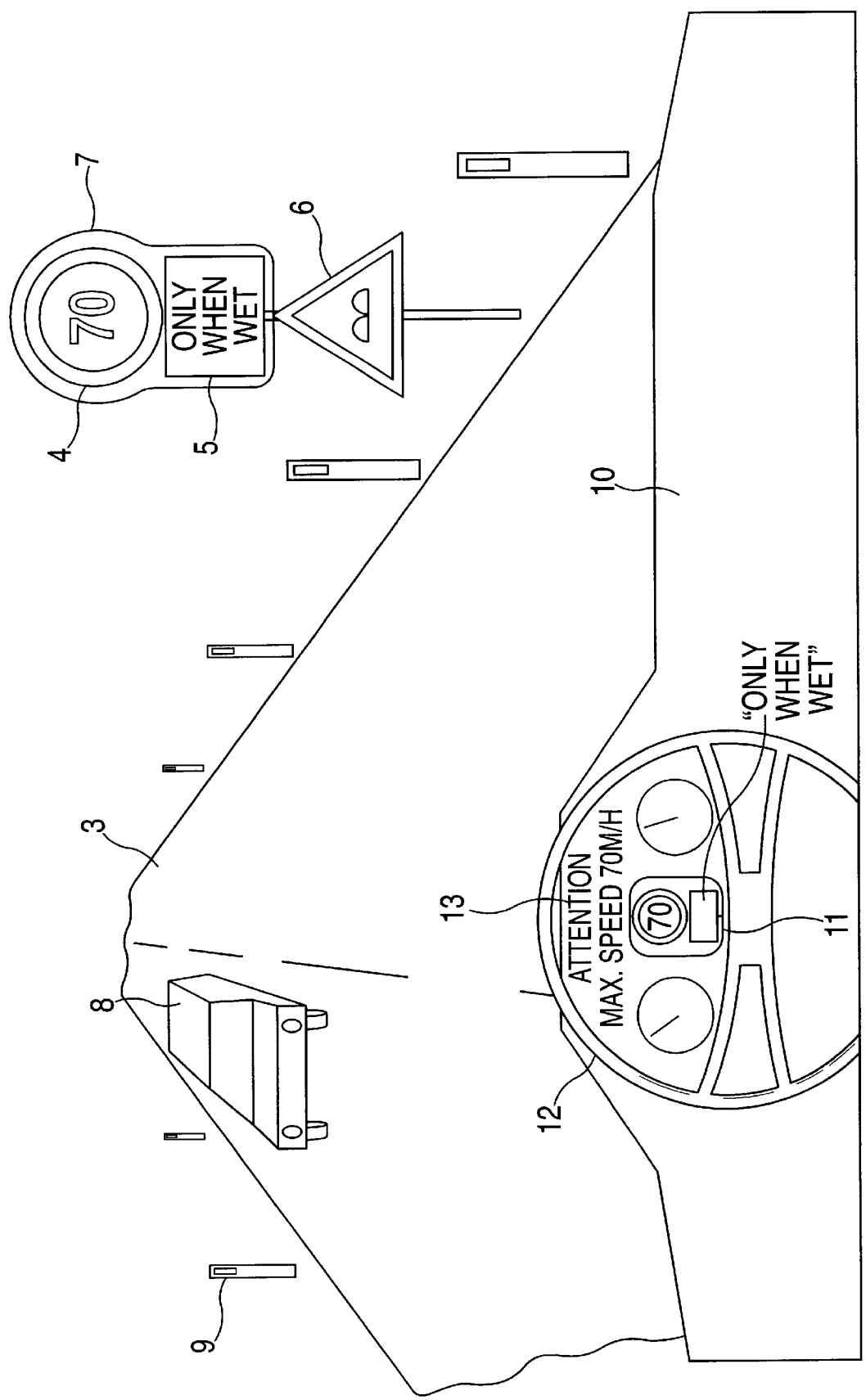
FIG. 3 shows an exemplary road scene with an exemplary display.
Figure 4:
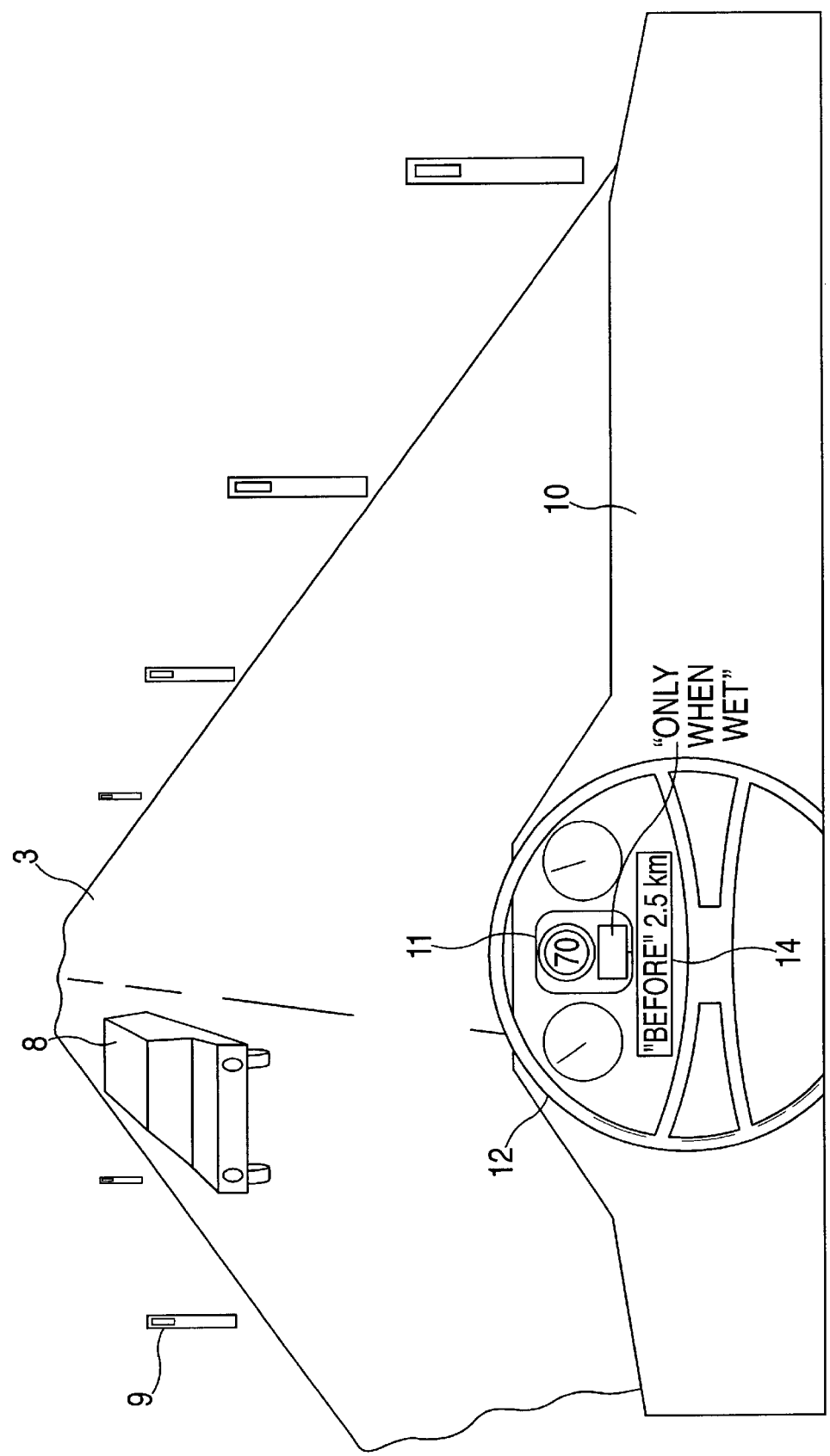
FIG. 4 shows a road scene with an exemplary display.
Figure 5:
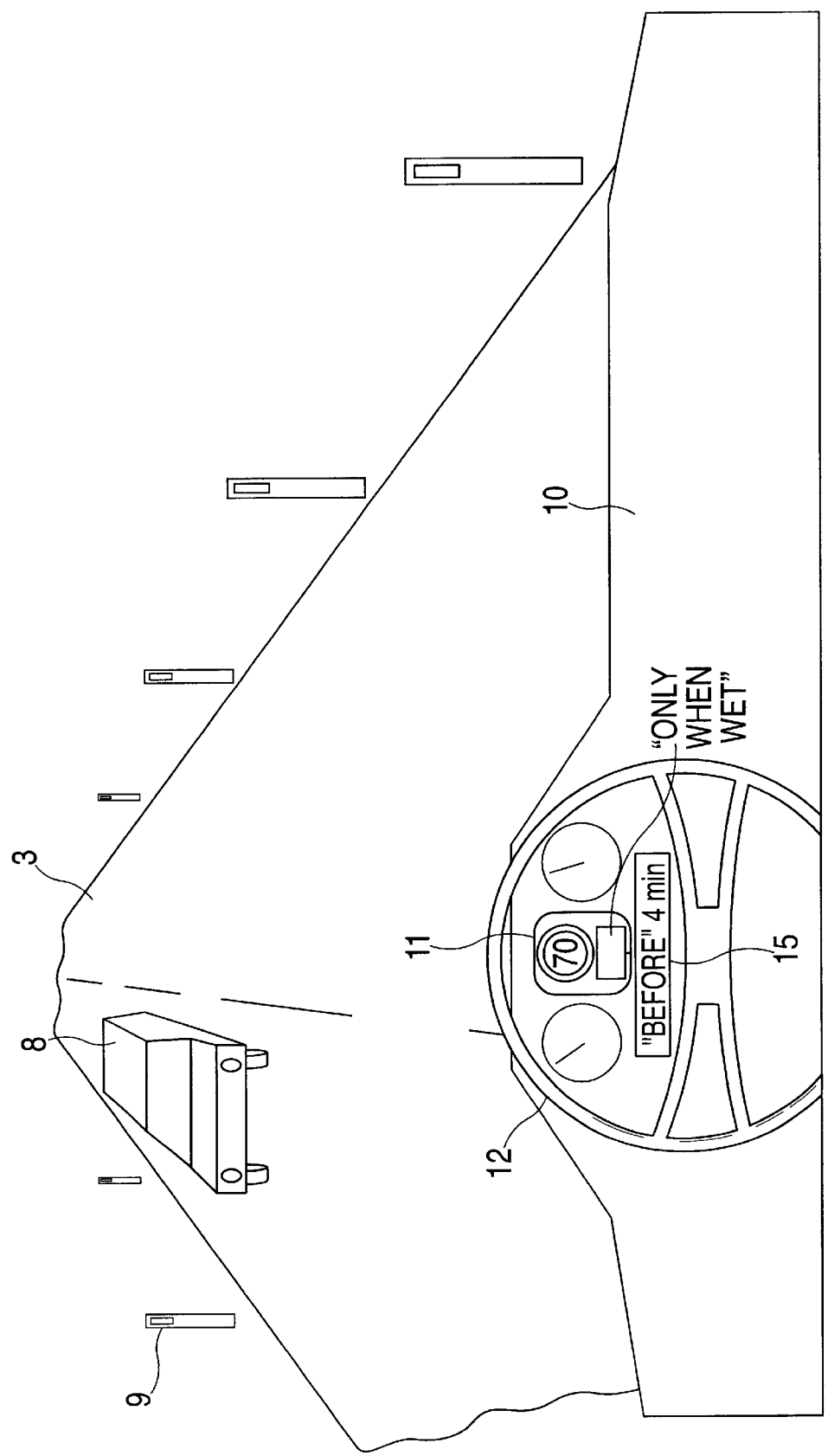
FIG. 5 shows an exemplary road scene with an exemplary display.

FIG. 3 shows a scene as described in FIG. 2, information 13 being additionally displayed in an area of the instrument panel. FIG. 4 shows an additional display form in which distance information 14 is shown in addition. FIG. 5 shows the display form with time information 15. FIG. 6 shows an exemplary implementation of the sensor configuration for driver support. Image sensor 2 is connected via a cable to an electronic analysis circuit 16. Electronic analysis circuit 16 has additional connections to additional sensors 19, for example, a touch key via which a driver's intentions can be communicated to the electronic analysis circuit, and vehicle sensors 18 which detect, for example, vehicle speed, distance or time measurements. Electronic analysis circuit 16 is connected to control unit 17 which, in turn, is connected to a display area 11. Image sensor 2 is positioned in the direction of vehicle travel and records video images of the vehicle surroundings. These images are sent to the electronic analysis circuit via the cable. Software must be used in the electronic analysis circuit which can separate the road signs needed for driver support from other image components. In general, not all road signs are separated out. This depends, however, on the selected type of driver support. If it is desired, for example, to support the driver only with regard to the particularly significant class of road signs that limit vehicle speed, the software will be configured to recognize only those road signs that indicate a limitation of maximum speed. The software recognizes road signs on the basis of their outline structure 7, on the basis of colors or on the basis of optical structures located on the sign. Suitable algorithms for the segmenting of road signs are provided in "Detektion von Verkehrszeichen aus monochronen Bildfolgen [Detection of Road Signs from Monochrome Image Sequences]," Master's thesis by Holger Janssen, Institute for Theoretical Information Technology, University of Hanover 1997. If a road sign necessary for driver support has been segmented in a sensor image, it can be segmented again in each subsequent image and tracked over time until it leaves the field of view of the sensor. By repeated segmenting and tracking over time, it is possible to achieve a stabilization of the recognition of relevant road signs. After segmenting, a classification must be carried out in a suitable manner since it must be decided whether a road sign relevant for driver support is present. In doing so, not only a road sign relevant for driver support is shown with its informational content but rather the image segment containing the road sign is presented directly to the driver via a display area 11. If the recognition and segmenting of road signs is incorrect, which cannot be completely ruled out with the complexity of road sign recognition, a randomly and incorrectly segmented scene segment without road signs is presented to the driver in his display area. He can detect the malfunction of the system immediately and act accordingly. The system does not mislead the driver into a false sense of security.

Various improvements to the system for support of the driver are additionally possible. The image quality of the image recorded by the image sensor can be improved under certain circumstances with the aid of algorithmic methods. Such methods include image brightening and/or darkening, contrast intensification and edge sharpening. This method merely improves the image for the driver's view without, however, distorting or interpreting its information content.

An exemplary embodiment of the system allows the most recently segmented road sign from the large number of road signs relevant to the level of driver support desired at the time to be continuously presented to the driver in display area 11. On expressways on which primarily speed limitations, passing prohibitions and cancellations of such prohibitions occur, the driver could be informed of the most recent applicable driving limitation by presentation of the most recent segmented road sign.

An additional exemplary embodiment of the system makes it possible to retain a certain number of the most recently segmented road sign images in an electronic memory. In this case, an input device via a keypad 19 must be provided for the driver which makes it possible for him to specify which sign he would like to have displayed to him. A sequential presentation of the stored road sign images, starting with the most recently segmented sign, is particularly practical. By the input of a signal, for example, via suitable touch keys or an acoustic input via a suitable input sensor 19, the driver can switch to the next previously segmented road sign. It is thus possible for the driver to be reminded of the most recently recognized and segmented road signs as he wishes. In addition to the exclusive presentation of the segmented road signs, an additional character interpretation may be practical. In this way the driver can be provided with symbolic information via defined characters 13, see FIG. 3. In this case, by comparing the displayed characters with the simultaneously presented image segment, the driver can immediately determine if the automatic road sign interpretation is incorrect. In this case also, the function of the system is transparent so that the responsibility remains exclusively with the driver.

In a further exemplary embodiment, warnings are output to the driver which can be obtained on the basis of information from additional vehicle sensors. Thus, for example, a speed signal can be combined with the output of a warning. If the driver is driving faster than is permitted by the maximum allowable speed according to the road sign, the analysis unit recognizes this discrepancy and generates an acoustic warning signal. In doing so, it is possible to activate a warning tone, an acoustic speech output or even an optical warning display.

In a further exemplary embodiment, lane recognition is implemented via the image sensor and the analysis unit. With the aid of such image-based lane tracking, it is possible for the analysis unit to detect when the vehicle pulls out into the opposite lane for the purpose of passing, for example. In connection with a previously recognized passing prohibition, it is then possible to emit a warning signal again.

In addition to the presentation of the road sign on display area 11, it is also possible to supply the driver with distance information indicating the distance between the present vehicle position and the position at which the road sign was detected. Additional information 14 is presented in the display area—see FIG. 4. Consequently, the driver has at least a limited possibility to check if the displayed road sign is at all still relevant to him. In this connection, the distance information can be obtained directly from the distance measuring equipment present in every vehicle or also by associating vehicle speed information with the time passed since the road sign was detected. The sensor signals are evaluated in analysis unit 16 which brings about a possible output in display area 11 via control unit 17.

As an alternative to a presentation of the distance information, time information can be displayed to the driver simultaneously with the presentation of the road sign. For this purpose, the time difference between detection of the road sign and the actual time must be recorded for the driver via control unit 17.

For image detection, a CMOS sensor having a non-linear wall characteristic is advantageous for road sign detection. Road signs generally have painted, metallic surfaces or plastic surfaces that are smooth and readily reflect incident light. With unfavorable light incidence or night driving with headlight illumination, it is thus possible for extreme brightness dynamics caused by reflection of light or other effects to occur. Such brightness differences can be controlled with the aid of a non-linear image sensor, making it possible to supply a simple preparation of an analyzable video image to the electronic analysis circuit. In this connection, an image sensor with a logarithmic characteristic is particularly advantageous since it ensures a constant contrast resolution over the entire brightness range.

What is claimed is:

1. A method for displaying information in a motor vehicle associated with a camera that is coupled to an image recognition arrangement for performing a control operation and an analysis operation, the method comprising the steps of:
    obtaining an image of a road sign using the camera;
    analyzing the image of the road sign using the image recognition arrangement in order to provide an image segment containing the road sign; and
    displaying the image segment directly to a driver of the motor vehicle on a display unit.

2. The method of claim 1, further comprising the steps of:
    analyzing information from at least one additional vehicle sensor using the image recognition arrangement; and displaying results of the analyzing step in addition to the image segment.

3. The method of claim 2, further comprising the step of displaying at least one of a distance and a time occurring since a prior recognition of a prior road sign.

4. The method of claim 1, further comprising the step of displaying a classification of a most recently recognized road sign.

5. The method of claim 1, wherein the image segment includes an outline of the road sign and a supplemental sign.

6. The method of claim 1, further comprising a performance of at least one of the steps of:

retrievably filing a most recently recognized road sign in a database; and presenting the most recently recognized road sign to the driver.

7. The method of claim 1, further comprising the step of providing to the driver at least one of an acoustic warning and an optical warning if a comparison of a setpoint value and an actual value relating to speeds of the motor vehicle indicates an excess speed.

8. The method of claim 1, further comprising the steps of:

recognizing a lane change by the motor vehicle using the image recognition arrangement; and triggering at least one of an acoustic warning and an optical warning if the lane change is in a prohibited passing zone.

9. The method of claim 1, wherein the camera includes at least one of a non-linear CMOS image sensor and a logarithmic CMOS image sensor.

10. A method according to claim 1, further comprising:

improving the image segment using an algorithmic method.

11. A method according to claim 10, wherein the algorithmic method used includes image brightening.

12. A method according to claim 10, wherein the algorithmic method used includes image darkening.

13. A method according to claim 10, wherein the algorithmic method used includes contrast intensification.

14. A method according to claim 10, wherein the algorithmic method used includes edge sharpening.

15. The method of claim 1, further comprising:

providing an optical warning if a comparison of a setpoint value and an actual value relating to speeds of the motor vehicle indicates an excess speed.

16. An apparatus for displaying information in a motor vehicle, the apparatus comprising:

a camera for obtaining an image of a road sign; and an arrangement for image recognition coupled to the camera, wherein the arrangement for image recognition is adapted for analyzing the image of the road sign and for providing an image segment containing the road sign for display on a display unit to a driver of the motor vehicle.

* * * * *